(12) United States Patent
Schmidt

(10) Patent No.: US 7,571,020 B2
(45) Date of Patent: Aug. 4, 2009

(54) METHOD AND SYSTEM FOR CONTROLLING PROCESS TOOLS BY INTERRUPTING PROCESS JOBS DEPENDING ON JOB PRIORITY

(75) Inventor: Kilian Schmidt, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 247 days.

(21) Appl. No.: 11/619,428

(22) Filed: Jan. 3, 2007

(65) Prior Publication Data
US 2007/0282477 A1 Dec. 6, 2007

(30) Foreign Application Priority Data
May 31, 2006 (DE) .................. 10 2006 025 406

(51) Int. Cl.
G06F 19/00 (2006.01)
G06F 7/00 (2006.01)
G06F 13/24 (2006.01)

(52) U.S. Cl. ............... 700/101; 700/121; 700/218; 710/260

(58) Field of Classification Search .......... 700/95, 700/97, 99, 100, 101, 117, 121, 218; 710/260, 710/261, 264
See application file for complete search history.

(56) References Cited

U.S. PATENT DOCUMENTS

| | | | | |
|---|---|---|---|---|
| 4,731,817 A | * | 3/1988 | Jonsson et al. ........ | 379/112.01 |
| 5,299,296 A | * | 3/1994 | Padalino et al. ........... | 358/1.13 |
| 5,832,301 A | * | 11/1998 | Yamaguchi .................. | 710/48 |
| 5,970,224 A | * | 10/1999 | Salgado et al. ............ | 358/1.16 |
| 6,219,502 B1 | * | 4/2001 | Osari et al. .................. | 399/82 |
| 6,341,907 B1 | * | 1/2002 | Katsuyoshi ................. | 400/582 |
| 6,470,231 B1 | * | 10/2002 | Yang et al. ................. | 700/121 |
| 6,785,013 B1 | * | 8/2004 | Ota et al. .................... | 358/1.15 |
| 6,856,848 B2 | * | 2/2005 | Matsumoto et al. ........ | 700/101 |
| 6,876,894 B1 | * | 4/2005 | Chen et al. ................. | 700/100 |
| 7,180,637 B2 | * | 2/2007 | Tanimoto .................... | 358/402 |
| 7,265,855 B2 | * | 9/2007 | Patton ........................ | 358/1.15 |
| 7,307,744 B2 | * | 12/2007 | Hikawa ...................... | 358/1.14 |
| 7,398,378 B2 | * | 7/2008 | Sugure et al. ............... | 712/244 |
| 2005/0052679 A1 | * | 3/2005 | Green et al. ............... | 358/1.14 |

FOREIGN PATENT DOCUMENTS

| | | |
|---|---|---|
| DE | 696 18 433 T2 | 11/1996 |
| DE | 1 708 061 A2 | 7/2003 |
| GB | 1 046 090 B1 | 9/1999 |

* cited by examiner

*Primary Examiner*—Crystal J Barnes-Bullock
(74) *Attorney, Agent, or Firm*—Williams, Morgan & Amerson

(57) ABSTRACT

By enabling an interleaved mode when supplying substrates from a plurality of load ports to a respective process module, a reduction of non-productive time of the process tool and/or a reduction of cycle time may be achieved compared to a conventional sequential processing of carriers. Upon arrival at a load port of the process tool, an appropriate priority may be assigned to the carrier, wherein a higher priority may enable the interruption of the processing of a lower-ranked substrate carrier.

14 Claims, 3 Drawing Sheets

METHOD AND SYSTEM FOR CONTROLLING PROCESS TOOLS BY INTERRUPTING PROCESS JOBS DEPENDING ON JOB PRIORITY

BACKGROUND OF THE INVENTION

1. Field of the Invention

Generally, the present disclosure relates to the field of fabricating products, such as semiconductor devices, in a manufacturing environment including process tools exchanging transport carriers with an automated transport system, wherein the products, such as substrates for semiconductor devices, are processed on the basis of groups defined by the contents of the transport carriers.

2. Description of the Related Art

Today's global market forces manufacturers of mass products to offer high quality products at a low price. It is thus important to improve yield and process efficiency to minimize production costs. This holds especially true in the field of semiconductor fabrication, since, here, it is essential to combine cutting-edge technology with mass production techniques. It is, therefore, the goal of semiconductor manufacturers to reduce the consumption of raw materials and consumables while at the same time improve process tool utilization. The latter aspect is especially important since, in modern semiconductor facilities, equipment is required which is extremely cost-intensive and represents the dominant part of the total production costs.

Integrated circuits are typically manufactured in automated or semi-automated facilities, thereby passing through a large number of process and metrology steps to complete the device. The number and the type of process steps and metrology steps a semiconductor device has to go through depends on the specifics of the semiconductor device to be fabricated. A usual process flow for an integrated circuit may include a plurality of photolithography steps to image a circuit pattern for a specific device layer into a resist layer, which is subsequently patterned to form a resist mask for further processes in structuring the device layer under consideration by, for example, etch or implant processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. Since many of these processes are very critical, a plurality of metrology steps have to be performed to efficiently control the process flow and to monitor the performance of the respective process tools. For example, frequently, so-called pilot substrates are processed and subjected to measurement procedures prior to actually releasing the associated group of "parent" substrates in order to test the compliance with predefined process margins. Typical metrology processes may include the measurement of layer thickness, the determination of dimensions of critical features, such as the gate length of transistors, the measurement of dopant profiles, and the like. As the majority of the process margins are device-specific, many of the metrology processes and the actual manufacturing processes are specifically designed for the device under consideration and require specific parameter settings at the adequate metrology and process tools.

In a semiconductor facility, a plurality of different product types are usually manufactured at the same time, such as memory chips of different design and storage capacity, CPUs of different design and operating speed and the like, wherein the number of different product types may even reach hundreds and more in production lines for manufacturing ASICs (application specific ICs). Since each of the different product types may require a specific process flow, different mask sets for the lithography, specific settings in the various process tools, such as deposition tools, etch tools, implantation tools, chemical mechanical polishing (CMP) tools and the like, may be necessary. Consequently, a plurality of different tool parameter settings and product types may be encountered simultaneously in a manufacturing environment. Thus, a mixture of product types, such as test and development products, pilot products, different versions of products, at different manufacturing stages, may be present in the manufacturing environment at a time, wherein the composition of the mixture may vary over time depending on economic constraints and the like, since the dispatching of non-processed substrates into the manufacturing environment may depend on various factors, such as the ordering of specific products, a variable degree of research and development efforts and the like. Thus, frequently the various product types may have to be processed with a different priority to meet specific requirements imposed by specific economic or other constraints.

Despite these complex conditions, it is an important aspect with respect to productivity to coordinate the process flow within the manufacturing environment in such a way that a high performance, for example in terms of tool utilization, of the process tools is achieved, since the investment costs and the moderately low "life span" of process tools, particularly in a semiconductor facility, significantly determine the price of the final semiconductor devices. In modern semiconductor facilities, a high degree of automation is typically encountered, wherein the transport of substrates is accomplished on the basis of respective transport carriers accommodating a specific maximum number of substrates. The number of substrates contained in a carrier is also referred to as a lot and the number of substrates is therefore frequently called the lot size. In a highly automated process line of a semiconductor facility, the transport of the carriers is mainly performed by an automated transport system that picks up a carrier at a specific location, for example a process or metrology tool, within the environment and delivers the carrier to its destination, for instance another process or metrology tool that may perform the next process or processes required in the respective process flow of the products under consideration. Thus, the products in one carrier typically represent substrates receiving the same process, wherein the number of substrates in the carrier may not necessarily correspond to the maximum number of possible substrates. That is, the lot size of the various carriers may vary, wherein typically a "standard" lot size may dominate in the manufacturing environment. For example, one or more pilot substrates, which may be considered as representatives of a certain number of parent substrates contained in a certain number of carriers filled with the standard lot size, may be transported in a separate carrier, since they may undergo a specific measurement process and therefore may have to be conveyed to a corresponding metrology tool, thereby requiring an additional transport job. Based on the results of the measurement process, the waiting parent substrates may then be delivered to the respective process tool.

The supply of carriers to and from process tools is usually accomplished on the basis of respective "interfaces," also referred to as load ports, which may receive the carriers from the transport system and hold the carriers to be picked up by the transport system. Due to the increasing complexity of process tools, having implemented therein a plurality of functions, the cycle time for a single substrate may increase. Hence, when substrates are not available at the tool, although being in a productive state, significant idle times or unproductive times may be created, thereby significantly reducing the utilization of the tool. Thus, typically, the number and configuration of the load ports is selected such that one or more carriers may be exchanged at the load port(s) while the functional module of the process tool receives substrates from another load port to achieve a cascaded or continuous operation of the process tool. The time for the exchange of carriers between the automated transport system and the respective process or metrology tool depends on the transport capacity of the transport system and the availability of the carrier to be conveyed at its source location. Ideally, when a corresponding transport request for a specified lot currently processed in a source tool is to be served, the respective substrates should be available at the time the transport system picks up the carrier including the lot and delivers the carrier at the destination tool such that a continuous operation can be maintained. Consequently, the respective carrier should be delivered to the destination tool when or before the last substrate of the carrier currently processed in the destination tool is entered into the process module so that a continuous operation may be achieved on the basis of the newly arrived carrier. Thus, for an ideal continuous operation of a process tool, one carrier would be exchanged while another carrier is currently processed. Depending on the capacity of the tool interface, for instance the number of load ports provided, a certain buffer of carriers and thus substrates may be provided in order to generate a certain tolerance for delays and irregular deliveries, which may however significantly contribute to tool costs. Moreover, as the actual carrier exchange time does not substantially depend on the lot size, whereas the time window for performing an actual carrier exchange is highly dependent on the respective lot size, since a small currently processed lot provides only a reduced time interval for exchanging, also referred to as a window of opportunity for carrier exchange, another carrier without producing an undesired idle time, the presence of a mixture of lot sizes, such as pilot lots, development lots and the like, or the presence of lots having a high priority, may negatively affect the overall performance of process tools.

In view of the situation described above, there is therefore a need for an enhanced technique that enhances the efficiency of process tools, especially in view of transport-related issues, while avoiding or at least reducing the effects of one or more problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to a technique that provides enhanced flexibility for processing substrates at a process tool when different groups of substrates are to be processed in one or more process modules of the process tool. Contrary to conventional techniques in which a specific group of substrates is processed in a continuous non-interrupted manner, referred to as a job, wherein at least all substrates contained in a specific substrate carrier are entered into the process module prior to supplying the substrates of another carrier into the respective process modules, the method disclosed herein enables an "interleaved" supply of substrates to respective process modules depending on the specific process conditions at the process tool. In this way, the supply of substrates from one carrier may be interrupted at any appropriate point in time and one or more substrates of one or more other carriers may be intermittently supplied according to the specific process requirements. Consequently, the tool utilization may be enhanced for various process conditions, such as the presence of carriers including very different lot sizes and/or the processing of carriers containing substrates of high priority and the like.

According to one illustrative embodiment disclosed herein, a tool controller comprises a job priority estimator configured to receive process information that at least indicates a current status of a carrier exchange interface of a process tool, wherein the job priority estimator is further configured to determine on the basis of the current status a first process priority for a currently processed job and a second process priority for a job to be processed in the process tool. The tool controller further comprises a job management unit connected to the job priority estimator and configured to interrupt the currently processed job when the first process priority is lower than the second process priority.

According to another illustrative embodiment, a process tool comprises a process module configured to process a plurality of substrates and a carrier exchange interface configured to exchange substrate carriers with an automated transport system of a manufacturing environment. The process tool further comprises a substrate exchange interface configured to exchange substrates between carriers and the process module. Moreover, a control unit is provided and connected to the carrier exchange interface and the substrate exchange interface, wherein the control unit is configured to initiate the substrate exchange interface to interleave substrates from at least two carriers during supply of substrates to the process module on the basis of at least one of a status of the carrier exchange interface and a priority of substrates contained in the at least two carriers.

According to still another illustrative embodiment, a method comprises supplying substrates from a plurality of substrate carriers to a process module of a process tool, wherein the process tool exchanges substrate carriers with a manufacturing environment via a carrier exchange interface. Furthermore, the method comprises temporarily interrupting the supply of substrates from a first carrier to the process module and supplying at least one substrate from a second carrier to the process module, when a process situation of the process tool is assessed to meet a specified criterion.

BRIEF DESCRIPTION OF THE DRAWINGS

The disclosure may be understood by reference to the following description taken in conjunction with the accompanying drawings, in which like reference numerals identify like elements, and in which.

Figure 1A:
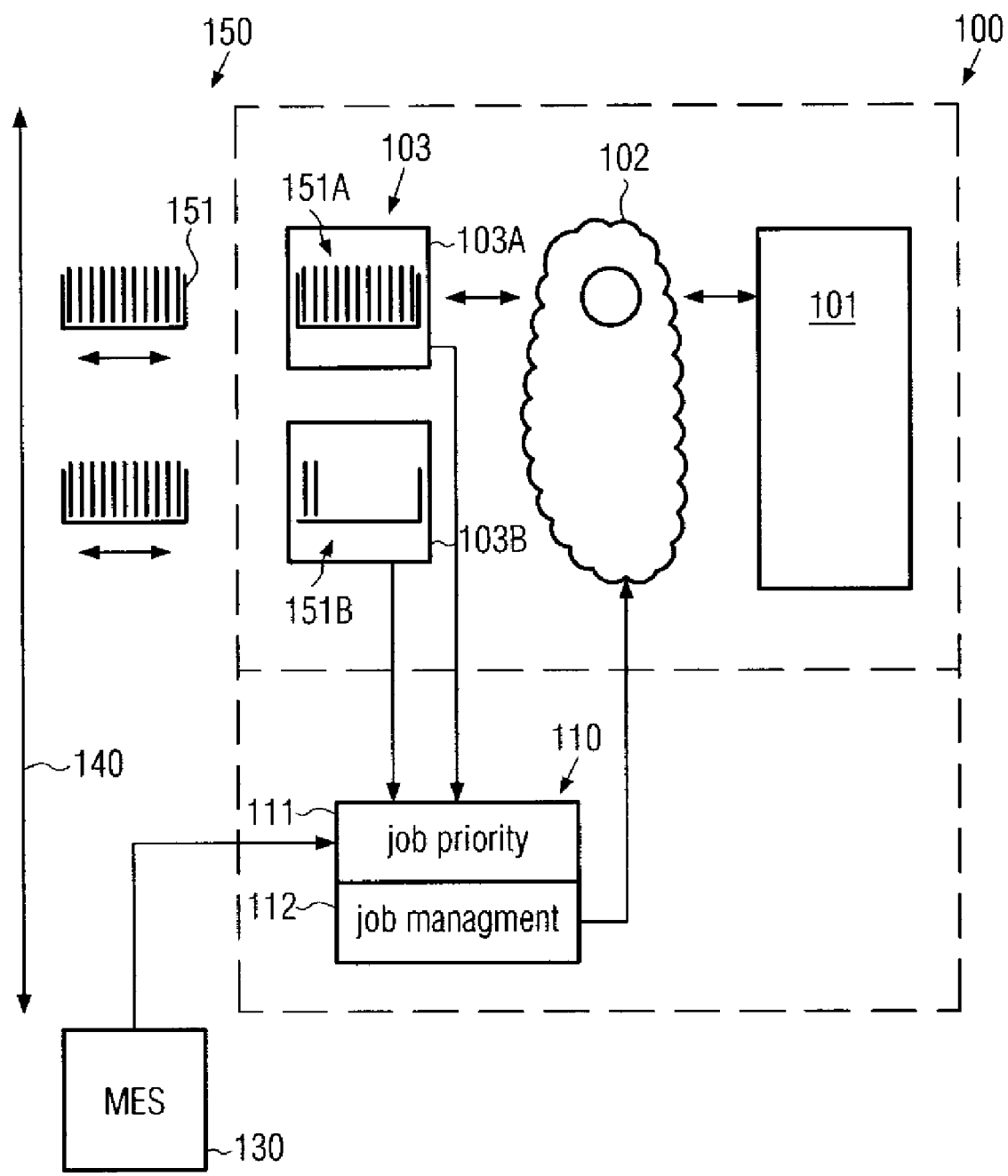
FIG. 1a schematically illustrates a manufacturing environment comprising an automated transport system and a process tool including an interface for substrate carrier exchange and a process controller enabling an "interleaved" supply of substrates from at least two different carriers to a process module.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure relates to a technique for enhancing tool performance in a manufacturing environment for specific process conditions, in which transport-related issues and/or process requirements may result in performance degradation in conventional strategies for handling the substrate transfer to and from a specific process module. In conventional techniques, substrates may, at least temporarily, be grouped into specific entities which require, at least for a part of the entire process flow, to be passed through one or more process steps. In this case, the respective substrates may be positioned in a respective transport carrier, or in several carriers, when the number of substrates belonging to the specific group exceeds the capacity of a single substrate carrier. In complex manufacturing environments, such as semiconductor facilities and the like, the process flow for completing the devices may require a large number of process steps, as previously described, wherein the group of substrates has to be passed through a plurality of process tools in a time-efficient manner, while at the same time ensuring a high degree of tool efficiency of the respective process tools. Typically, the substrate carriers are conveyed within the manufacturing environment on the basis of an automated transport system, which "communicates" with the respective process tools via appropriate interfaces, that is, load ports which in turn are connected to a tool internal interface or substrate handling system for exchanging substrates between the load ports and the actual process module or modules, depending on the complexity of the respective process tool. The conventional strategy, that is, supplying all substrates of a specific carrier to a specified process module while exchanging another carrier with the automatic transport system so as to provide further substrates for the processing in the specified process module, may result under certain process conditions in a significant loss of tool performance. For example, in some cases, a certain amount of substrates may have to be processed at some or all process tools in the manufacturing environment with high priority without tolerating significant waiting times at the several process tools. Thus, corresponding groups of substrates or lots arriving at the specific process tool may need to be immediately processed by the process tool. In the conventional technique, the corresponding process tool may currently process a specific carrier or substrate group, which according to the conventional techniques may not be interrupted until the respective job, i.e., the processing of the respective group of substrates, is completed. Consequently, a dedicated process tool has to be maintained in an idle state, when a corresponding lot of high priority substrates, sometimes referred to as rocket lot, is scheduled for a certain process step. Consequently, since the entire processing in the manufacturing environment may be highly dynamic, the respective process tool has to be reserved over an extended time interval, in which the arrival of the lot of high priority is expected, thereby contributing to a high amount of unproductive time for the process tool under consideration.

In other cases, the presence of small lots may prevent a proper cascading of operation of the respective process tool, as previously described, since the window of opportunity for exchanging carriers with the automated transport system may be reduced compared to the situation of continuously processing substrate lots of standard size. A similar situation occurs when pilot substrates, which may be considered as a small lot to be processed prior to the parent lot, arrive at a specific tool and may have to wait until the currently processed carrier is completed, thereby also significantly delaying the further processing of the parent lot.

Consequently, the method disclosed herein provides significantly increased flexibility since the supply of substrates to the process module of a respective process tool may be controlled on the basis of process and/or substrate requirements, since a currently processed job may be interrupted at any appropriate point in time in order to allow the insertion of one or more substrates of other jobs or carriers. For instance, in the above-described case of lots of high priority, a currently processed job may be immediately interrupted as soon as a corresponding lot of high priority arrives at the respective process tool, thereby substantially avoiding any idle times of the process tools while nevertheless guaranteeing timely processing of the lots of high priority. In other cases, when a carrier of reduced lot size arrives at the specific process tool, the current processing of a standard lot size job may be interrupted at any appropriate time in order to process the small lot size, which may then be efficiently exchanged while the processing of the previously interrupted job is resumed, thereby providing a moderately high time interval for carrier exchange for both the previously interrupted job as well as the job of small lot size so that an adverse effect of the presence of a small lot size at the process tool with respect to tool utilization may be reduced. For this purpose, in some illustrative embodiments, each carrier arriving at the process tool is assigned a dedicated priority, which may be based on an externally assigned priority of the respective substrates contained in the carrier, and/or which may be determined on the specific process condition, i.e., on the basis of jobs currently processed in the tool, the lot size of the currently processed job and the newly arriving job, and the like. Based on the corresponding priorities of the various jobs currently processed or to be processed in the respective tool, it may be decided whether or not and when a currently being processed job having a lower priority is to be interrupted and a respective job of higher priority is performed intermittently. In some cases, the priority assigned to each job may be established on the basis of various criteria, such as priority of the respective substrates, such as rocket lots, total cycle time of specific lots, tool utilization and the like. Moreover, in some illustrative embodiments, the corresponding priorities may be dynamically changed depending on specific process situations. For instance, during a certain phase, the reduction of cycle time of specific lots may be favored at the cost of a somewhat reduced overall tool utilization, while, in other production phases, a maximum tool performance may be the decisive criterion for assigning respective priorities to the respective lots arriving at specific process tools.

It should be appreciated that the present invention is particularly advantageous in the context of complex manufacturing environments as are typically encountered in facilities for fabricating microstructure devices, such as integrated circuits and the like, since here a plurality of different product types are to be processed in a highly complex manufacturing environment. The principles of the present invention may, however, also be applied to any complex manufacturing environment in which automated material transport to a plurality of different process tools is employed. Consequently, the present invention should not be considered as being restricted to semiconductor facilities, unless such restrictions are explicitly set forth in the specification and/or the appended claims.

FIG. 1a schematically illustrates a manufacturing environment 150 which, in one illustrative embodiment, may represent a manufacturing environment for the fabrication of semiconductor devices, such as integrated circuits, micromechanical devices, micro-optical devices and the like. It should be appreciated that the term "semiconductor device" is to be understood as a generic term for any device being formed on the basis of micro-electronic and/or micro-mechanic manufacturing techniques. The manufacturing environment 150 may comprise an automated transport system 140, which is configured to pick up, convey and dispatch carriers 151, depending on a predefined schedule. For instance, in semiconductor facilities, the automated transport system 140, also referred to in this case as an automated material handling system (AMHS), is configured to pick up appropriate transport carriers, such as front opening unified pods (FOUP) and the like, which are typically configured to accommodate a specific maximum number of substrates. For instance, in many semiconductor facilities, the respective carriers 151 are configured to contain 25 substrates. It should be appreciated that the maximum number of substrates that may be contained in a single carrier 151 may not necessarily represent the standard lot size, which may be selected on a basis of company internal constraints and the like. The automated transport system 140 may further be configured to exchange the carriers 151 with a plurality of process tools 100 within the environment 150, wherein, for convenience, a single process tool is illustrated. For this purpose, the process tool 100 may comprise a carrier exchange interface 103, which may be configured so as to receive a plurality of carriers 151 from the system 140 and hold respective carriers 151 for being picked up by the system 140 when the processing of the respective substrates in the carriers 151 within the tool 100 is completed. In some illustrative embodiments, the respective carrier exchange interface 103 may comprise a plurality of load ports 103A, 103B which may represent respective tool stations in which the system 140 may deliver a carrier 151 including substrates to be processed and may pick up a carrier 151 including substrates processed within a process module 101, which may, depending on the complexity of the tool 100, comprise one or more individual process chambers. It should be appreciated that the number of load ports 103A, 103B may depend on the configuration of the tool 100, wherein an increased number of load ports may provide increased carrier exchange capability at the expense of increased tool complexity, tool size and tool costs.

The process tool 100 may further comprise a tool internal substrate exchange interface 102, which may represent a substrate handling system, such as a robot handler, that is configured to receive substrates from the load ports 103A, 103B and supply the substrate to the process module 101 and return processed substrates into the respective carriers in the load ports 103A, 103B. Furthermore, the process tool 100 may comprise a controller 110, which, in one illustrative embodiment, may represent an integral part of the tool 100, while, in other embodiments, the controller 110 may be external to the tool 100 and may be operatively connected thereto in order to perform the respective transport-related control function. The controller 110 may be configured to control the operation of the substrate exchange interface 102 on the basis of process information indicating the current tool status so as to coordinate the supply of substrates from two or more carriers placed on the respective load ports 103A, 103B to the process module 101 in an interleaved mode, if required. In one illustrative embodiment, the controller 110 may comprise a job priority estimator 111, which is operatively connected to the carrier exchange interface 103 so as to receive process information regarding the status of the interface 103 and/or the status of substrates contained therein. The job priority estimator 111 may be configured to extract a corresponding status of the interface 103 from the respective process information and to assign an appropriate priority to each of the carriers 151 positioned in the interface 103. For example, each newly arriving carrier 151 may be assigned a specific priority on the basis of an externally assigned priority of substrates contained in the respective carrier 151, and/or the number of substrates contained in the carrier 151, and/or on the basis of the number of carriers contained in other load ports presently not exchanging carriers with the automated transport system 140, and the like. The external priority of substrates and thus carriers may be stored in a manufacturing execution system (MES) 130 or any other source and may be communicated to the job priority estimator 111 for further evaluation. For instance, if a carrier 151 arrives at the load port 103B, in which a small number of substrates may be contained, such as a single substrate representing a pilot, a qualification lot and the like, the respective carrier or lot may receive a higher priority compared to other lots in the remaining load port 103A when containing a lot of greater size or standard size. In other cases, the job priority estimator 111 may identify an externally assigned priority of the substrate, for instance if the substrates are indicated as a rocket lot that is to be processed immediately after arrival at the process tool 100. Consequently, the estimator 111 may establish a specific hierarchy of the lots within the interface 103 on the basis of the respective priorities. In some illustrative embodiments, the priorities of carriers already present in one of the load ports 103A, 103B may receive updated priorities by the job priority estimator 111 when a new carrier arrives and/or when the process situation may change and may require for instance an accelerated or delayed handling of a specific lot.

Moreover, in one illustrative embodiment, the controller 110 may further comprise a job management unit 112, which is connected to the estimator 111 and is configured to determine, on the basis of the respective hierarchy established by the estimator 111, an appropriate operational mode for the internal substrate exchange interface 102 for exchanging substrates between the load ports 103A, 103B and the process module 101. For this purpose, the job management unit 112 may be configured to instruct the respective components of the interface 102 for supplying substrates to the module 101 according to the determined operational mode, for instance a sequential mode, in which all the substrates of a carrier presently processed are supplied to the module 101 before a substrate of a next carrier is supplied to the module 101, or in an interleaved mode, wherein, prior to supplying all substrates of one carrier, at least a substrate of a different carrier is supplied to the process module 101.

During operation of the process tool 100 in the manufacturing environment 150, the system 140 may exchange the carriers 151 with the interface 103, wherein a corresponding carrier exchange time may typically take several minutes until a carrier 151 ready to be picked up by the system 140 is actually picked up by the system 140 and until a new carrier 151 is delivered to the respective load port. For convenience, it may be assumed that a carrier 151A of standard lot size is currently processed in the load port 103A, that is, the respective substrates therein, which may be considered as a first job to be processed in the module 101, are delivered via the tool internal transport system 102 to the process module 101, while a second carrier 151B is arriving at the load port 103B, which may comprise, for instance, a small lot such as a pilot lot, a qualification lot, a development lot and the like. For instance, the second carrier 151B may include a single substrate. Upon arrival, the job priority estimator 111 may receive corresponding process information indicating, in one illustrative embodiment, an externally assigned priority of the lot in the carrier 151B, the size of the lot and the like. Based on the respective process information, the estimator 111 may determine a priority for the carrier 151B, for instance on the basis of predefined criteria. For instance, the estimator 111 may operate on the basis of a general rule based on the concept of maintaining a high tool utilization. In this case, the estimator 111 may first check the internal priority of the lot in the carrier 151B so as to identify any substrates that need to be processed with high priority as dictated by an externally assigned high priority. If, for example, a corresponding priority value is substantially identical to the priority values of the substrates currently processed from the carrier 151A, that is, if, for instance, a rocket lot or the like is not identified, the estimator 111 may assign the carrier 151B a corresponding priority on the basis of the lot size contained therein, which in the present example may be higher compared to the standard lot size in the carrier 151A. A higher priority for smaller lot sizes may be assigned in order to increase tool utilization, as will be described in more detail with reference to FIGS. 1b-1d.

Figure 1B:
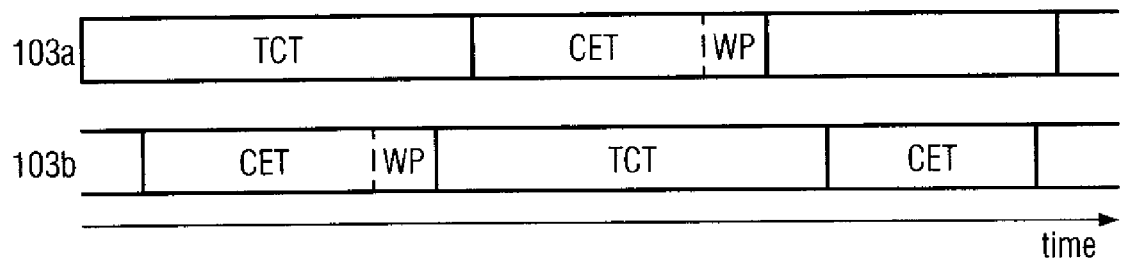
FIGS. 1b-1e schematically illustrate time diagrams representing various operational modes of the process tool as shown in FIG. 1a compared to a conventional tool behavior.

FIG. 1b schematically illustrates a time diagram for a typical process situation of the tool 100, when operating on the basis of standard lot sizes, wherein the various lots arriving at the tool 100 may have substantially the same externally assigned priority with respect to process requirements. In this case, the carrier 151A processed in the load port 103A may be cycled through the module 101, thereby requiring a total cycle time (TCT), wherein, in the meantime, the load port 103B may be available for carrier exchange so as to discharge already processed substrates and to receive substrates to be newly processed. It may be assumed that the actual carrier exchange time (CET) will be less than the total cycle time of the substrates in the carrier 151A. Thus, in such a process situation, the carrier 151B, in this example containing a standard lot size, is positioned in the second load port 103B and waits for processing as indicated by the interval WP. Thus, after the last substrates of the carrier 151A are delivered to the process module 101, the interface 102 starts supplying substrates from the carrier 151B so that no unproductive time is generated within the module 101. After all substrates of the carrier 151A have been passed through the module 101, the substrates are available in the carrier 151A for exchange, while the second carrier 151B continues to supply substrates to the module 101. During the next carrier exchange time at the load port 103A, which may not necessarily be equal to the CET previously obtained in the second load port 103B, a next carrier is available at the first load port 103A and may wait for processing as indicated by WP. Consequently, after the last substrate of the carrier 151B has entered the module 101, further substrates from the newly arrived carrier at the load port 103A are available and ensure substantially continuous processing of the module 101. In this way, a cascaded operation is achieved.

Figure 1C:
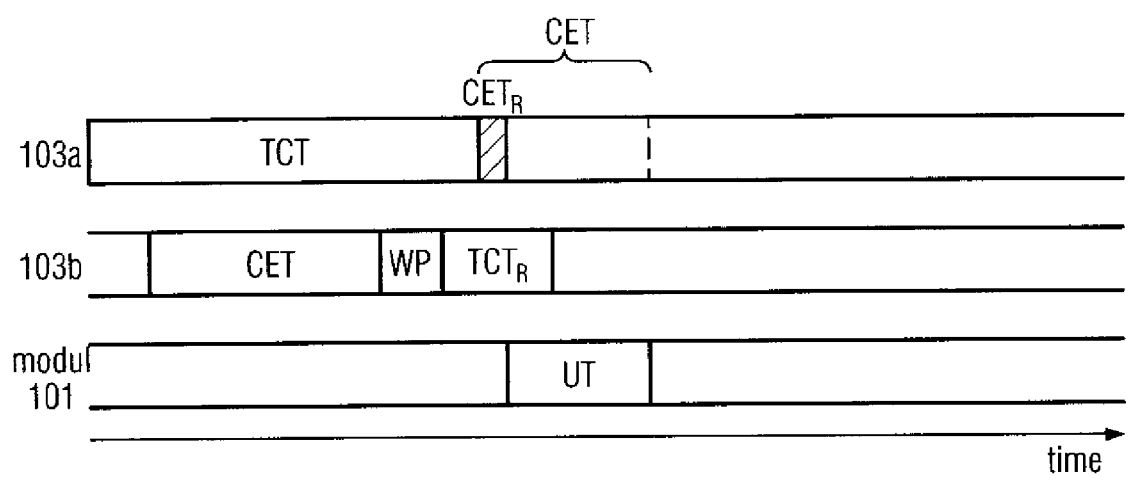

FIG. 1c schematically illustrates a process situation, which may frequently occur in conventional process tools, wherein a carrier containing a small lot size arrives at the second load port 103B. Thus, after this carrier 151B is available at the second load port 103B, and possibly after a certain period for waiting for processing WP, the substrates contained therein are supplied to the process module 101, while the substrates of the carrier 151A are successively returned to the load port 103A and after the total cycle time TCT, the corresponding carrier 151A may be exchanged. Due to the significantly reduced total cycle time $TCT_R$ for the carrier 151B at the second load port 103B, only a short interval may be available for exchange of carrier 151A, indicated as $CET_R$, which may be significantly shorter compared to the actual CET, thereby generating a non-productive process time, indicated UT, in the module 101 after the total cycle time for the small lot size. After completing the carrier exchange in the first load port 103A, further substrates may be supplied to the module 101, while the carrier 151B may be exchanged and the further processing may continue, for instance as shown in FIG. 1b, when further carriers with standard lot size are delivered.

Figure 1D:
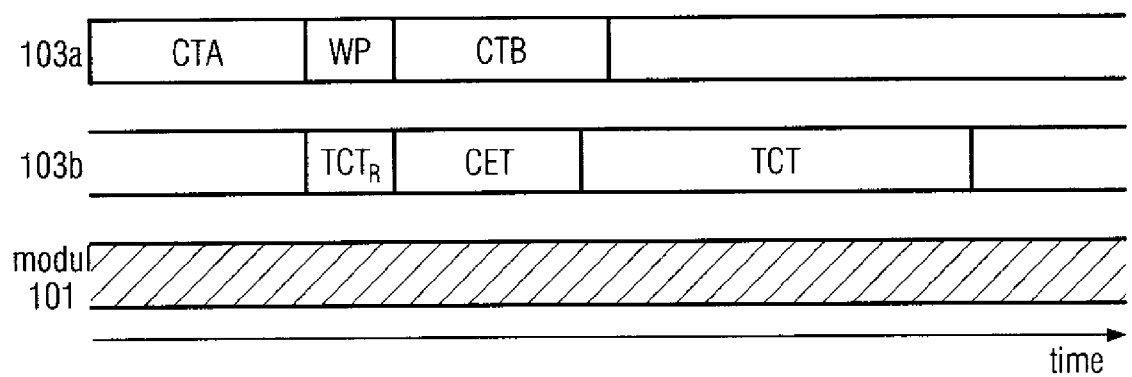

FIG. 1d schematically illustrates the situation as described in FIG. 1a, wherein, however, contrary to conventional techniques, the job priority estimator 111 assigns a high priority to the carrier 151B, indicating a preferred processing of the carrier 151B compared to the carrier 151A having the lower priority. Based on the corresponding priority values, the job management unit 112 may therefore instruct the interface 102 to interrupt the supply of substrates from the first load port 103A and continue the supply from the carrier 151B having the higher priority. For example, the unit 112 may interrupt the processing of the carrier 151A as soon as the carrier 151B having the higher priority is available at the second load port 103B. In this way, the window of opportunity of carrier exchange for the first carrier 151A is increased compared to conventional techniques.

FIG. 1d schematically illustrates the situation when substantially half of the substrates of the carrier 151A have been transferred by the system 102 and are currently processed in the module 101. Upon availability of the second carrier 151B having the higher priority, the substrates contained therein may be transferred by the system 102, thereby interrupting the supply of the substrates from the carrier 151A. Consequently, the first portion of the lot of the carrier 151A may have a cycle time CTA. After completion of the reduced total cycle time of the carrier 151B, the carrier 151B may be exchanged while processing of the first carrier 151A is resumed, thereby avoiding the short CET required for the carrier 151A on load port 103A compared to the above-described situation without inducing a short required CET for carrier 151B on load port 103B. If the remaining portion of the total cycle time of the carrier 151A, indicated as CTB, is sufficiently long, the carrier exchange may be performed substantially without causing non-productive times in the module 101 or at least a significantly reduced amount compared to the situation as described with reference to FIG. 1c. If the next carrier at the second load port 103B is a carrier with standard lot size, the carrier 151A in the first load port 103A may be exchanged without causing non-productive process time in the module 101.

Similarly, a significant gain in performance may be obtained for the processing of small pilot lots, since here typically the pilot lot has to be processed and subjected to metrology, while a corresponding parent lot is waiting for the result of the measurement and is subsequently released for processing.

Figure 1E:
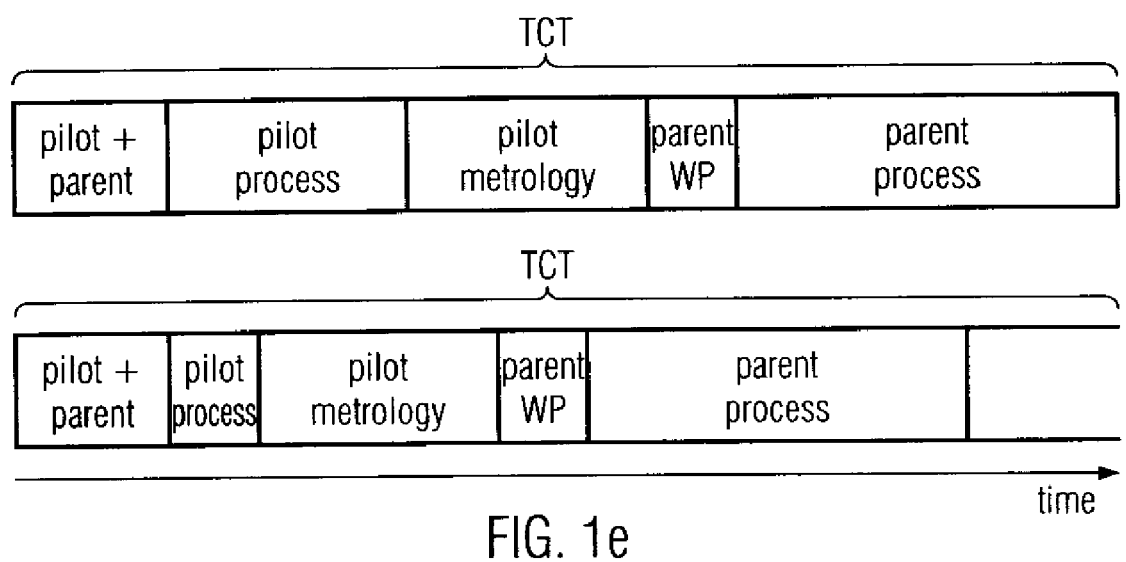

FIG. 1c schematically illustrates a corresponding time diagram for an operational mode without interleaved substrate supply (upper portion) and a process mode according to the present invention (lower portion). In a first time interval, the pilot lot and the parent lot may wait for processing and thereafter the pilot lot may arrive at the process tool 100, while a standard lot size may be currently processed. Depending on the point in time of arrival, up to 25 substrates (if a standard lot size of 25 is assumed) may be processed prior to passing the pilot lot through the module 101. For instance, for a single substrate in the pilot lot, up to 25 substrate cycles may be required upfront processing the pilot lot. Thereafter, the pilot lot is subjected to measurement and after receiving the results the parent lot may be released. Depending on the process situation at the tool 100, the parent lot may have to wait for processing and subsequently the actual process sequence may be performed, resulting in an overall cycle time for pilot plus parent lot as indicated in FIG. 1e. Contrary thereto, after the pilot lot has arrived at the tool 100, the lot may be immediately processed on the basis of the process strategy described above, thereby significantly reducing the pilot process interval, as indicated in FIG. 1e in the lower portion. Thereafter, the metrology processes and the further processes may be performed in a similar fashion as described above, thereby resulting in a significant reduction of the overall cycle time of the pilot and parent lot. It should be appreciated that, due to the moderately long time interval for measuring the pilot lot and waiting for the metrology results, the start of processing the parent lot is typically substantially independent from the previous processing of the pilot lot, so that the previously gained reduction of cycle time of the pilot lot may be maintained, thereby typically contributing to a reduction of the overall cycle time of the respective process sequence.

In the system described with reference to FIG. 1a, the process module 101 may represent a module representing a single process path for performing a specific process step or process sequence. In other illustrative embodiments, two or more equivalent process modules 101 may be provided, which may be served in parallel by the interface 103 via the tool internal interface 102. In this case, an interleaved operational mode may also be used, wherein, in one illustrative embodiment, one of the currently processed jobs having the lowest priority may be interrupted upon arrival of a job having or receiving a higher priority, for instance a higher externally assigned priority or a specific priority as assigned by the job priority estimator 111 on the basis of the current process situation, for instance the lot size and the like. In this way, only the cycle time of the job having the lowest priority may be increased for the benefit of an enhanced tool performance and/or a reduced cycle time, as is previously explained. In still other illustrative embodiments, the respective priorities of jobs currently processed in parallel may be dynamically adapted, for instance for otherwise initially identical priorities of the currently processed jobs, upon arrival of a job of small lot size. For example, one of the carriers of the currently processed jobs that has the highest number of substrates still to be processed may be assigned the lowest priority, since in this case the window of opportunity for a carrier exchange provided by this carrier is maximized.

In other embodiments, the respective priorities of carriers currently being processed or waiting for processing may be dynamically adapted upon arrival of a small lot size in order to increase tool performance. For instance, when a small lot arrives at one of the load ports, from which most of the substrates of the respective carrier have already been supplied to the module 101 and the tool comprises more than two load ports, the estimator 111 may re-assign the priority of the waiting carrier, accommodating for instance a standard lot size so as to receive a higher priority compared to the arriving small lot in order to initiate the processing of the waiting carrier having temporarily a higher priority than the incoming small lot. Thereafter, the processing of the carrier may be interrupted when substantially half of the substrates are supplied and the small lot may resume the highest priority and may now be intermittently processed to provide a large window of opportunity for both the small lot and the interrupted lot.

It should be appreciated that the above process strategy may also be advantageously applied to batch tools, when the batch size, i.e., a group of substrates processed in parallel within a respective process chamber, is less than the maximum lot size. Also, in this case, the supply of substrates from a specific carrier for building appropriate batches may be interrupted upon arrival of a carrier having a smaller lot size and/or a higher priority.

As a result, the present disclosure provides an enhanced technique for operating a tool internal substrate handling system in that the substrate supply from carriers located at different load ports may be performed in an interleaved mode depending on the specific process condition. In this way, the supply of substrates from a carrier may be interrupted in order to supply substrates having a higher priority, which may represent high priority substrates that have to be processed immediately after arrival at a specific process tool, substrates of small lot size, which may otherwise result in increased non-productive idle times of the process tool, and the like. For instance, upon arrival of a rocket lot, the processing of a specific carrier may be immediately interrupted and may be resumed after the processing of all substrates of the rocket lot. In this way, the reservation of precious tool capacity while awaiting the rocket lot may be substantially avoided. In other cases, small lots, such as test and development lots, pilot lots, qualification lots and the like, may be processed in an interleaved mode, thereby reducing or even avoiding any non-productive times of the respective process module since the corresponding window of opportunity for carrier exchange may be increased compared to a pure sequential processing of carriers containing lots of varying sizes.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A process tool, comprising:
   a process module configured to process a plurality of substrates;
   a carrier exchange interface configured to exchange substrate carriers with an automated transport system of a manufacturing environment;
   a substrate exchange interface configured to exchange substrates between carriers and said process module; and
   a control unit in communication with said carrier exchange interface and said substrate exchange interface, said control unit being configured to initiate said substrate exchange interface to supply substrates from at least two carriers to said process module in an interleaved manner on the basis of at least one of a status of said carrier exchange interface and a priority of substrates contained in said at least two carriers.

2. The process tool of claim 1, wherein said control unit is further configured to determine a window of opportunity for carrier exchange of said at least two carriers and to determine an interleaving mode for supply of said substrates to the process module on the basis of said window of opportunity.

3. The process tool of claim 1, wherein said control unit is configured to interrupt the supply of substrates of a first one of said at least two carriers and to start the supply of a second one of said at least two carriers, when a process priority of said second carrier is higher than a process priority of said first carrier.

4. The process tool of claim 3, wherein said control unit is further configured to determine the process priority of said at least two carriers on the basis of a window of opportunity of carrier exchange.

5. The process tool of claim 1, wherein said carrier exchange interface comprises a plurality of load ports.

6. A method, comprising:
   supplying substrates from a plurality of substrate carriers to a process module of a process tool, said process tool exchanging substrate carriers with a manufacturing environment via a carrier exchange interface; and
   temporarily interrupting the supply of substrates from a first carrier to said process module and supplying at least one substrate from a second carrier to said process module, when a process situation of said process tool is assessed on the basis of a priority for processing substrates from said plurality of substrate carriers.

7. The method of claim 6, further comprising assessing said process situation on the basis of process information related to an operational status of said carrier exchange interface.

8. The method of claim 7, wherein said second carrier contains less substrates compared to said first carrier and wherein assessing said process situation comprises determining an available time interval for carrier exchange for said first and second carriers so as to generate a minimum non-productive time of said process module.

9. The method of claim 6, wherein a specified criterion for assessing said process situation includes arrival of said second carrier including substrates having highest priority for being processed in said process module.

10. The method of claim 9, wherein all substrates having highest priority are supplied to said process module prior to resuming supply of substrates of said first carrier.

11. The method of claim 6, further comprising determining a process priority for each newly arriving carrier and processing said second carrier on the basis of the determined process priorities.

12. The method of claim 11, wherein said process priority for each newly arriving carrier is determined on the basis of a lot size of each newly arriving carrier.

13. The method of claim 12, wherein said process priority for each newly arriving carrier is determined on the basis of a process status of the substrates contained in the newly arriving carriers.

14. The method of claim 6, further comprising simultaneously supplying substrates from another carrier to a second process module and temporally interrupting supply of substrates of said another carrier and supplying at least one substrate of said second carrier to said second process module.

* * * * *